United States Patent
Puchleitner et al.

(10) Patent No.: US 11,577,473 B2
(45) Date of Patent: Feb. 14, 2023

(54) METHOD OF MANUFACTURING A PLASTIC TANK WITH REINFORCEMENTS

(71) Applicant: MAGNA STEYR Fuel Systems GesmbH, Sinabelkirchen (AT)

(72) Inventors: Rainer Puchleitner, Graz (AT); Peter Gutmann, Sinabelkirchen (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 162 days.

(21) Appl. No.: 16/869,686

(22) Filed: May 8, 2020

(65) Prior Publication Data
US 2020/0361159 A1 Nov. 19, 2020

(30) Foreign Application Priority Data
May 15, 2019 (EP) .................................... 19174651

(51) Int. Cl.
*B29C 65/00* (2006.01)
*B29C 51/08* (2006.01)
(Continued)

(52) U.S. Cl.
CPC ............ *B29C 66/721* (2013.01); *B29C 51/08* (2013.01); *B29C 51/12* (2013.01); *B29C 51/145* (2013.01);
(Continued)

(58) Field of Classification Search
CPC ....... B29C 66/721; B29C 51/08; B29C 51/12; B29C 51/145; B29C 65/02; B29C 66/712;
(Continued)

(56) References Cited

U.S. PATENT DOCUMENTS 4,767,321 A * 8/1988 Chilva .................... F26B 15/18
34/208
2015/0027633 A1* 1/2015 Criel ................... B29C 65/1496
156/322

FOREIGN PATENT DOCUMENTS

CN 102892568 A 1/2013
CN 103302856 A 9/2013
(Continued)

OTHER PUBLICATIONS

Bjornsson et al., "Automated Material Handling in Composite Manufacturing Using Pick-and-Place Systems—A Review", Robotics and Computer Integrated Manufacturing, 51, pp. 222-229, 2018. (Year: 2018).*
(Continued)

*Primary Examiner* — Michael N Orlando
*Assistant Examiner* — Christopher W Raimund
(74) *Attorney, Agent, or Firm* — Jordan IP Law, LLC; Todd A. Vaughn

(57) ABSTRACT

A method for producing a plastic tank having one or more reinforcements. The method includes forming at least one part of the tank wall with a semi-finished panel made of plastic having at least one outer layer composed of a first thermoplastic, forming a reinforcement for the tank wall with at least one fibre-reinforced structural component comprising a matrix composed of a second thermoplastic that is weldable to the first thermoplastic. The fibre-reinforced structural component is then applied to a predefined region of the at least one outer layer of the semi-finished panel. The fibre-reinforced structural component is then fused with the outer layer of the semi-finished panel by applying heat to the semi-finished panel and the applied fibre-reinforced structural component. The fused fibre-reinforced structural component and semi-finished panel is then formed into a final
(Continued)

shape. Optionally, the formed component is then connected to at least one other part of the tank wall to form the complete tank wall.

17 Claims, 2 Drawing Sheets

(51) Int. Cl.
  *B29C 51/12* (2006.01)
  *B29C 51/14* (2006.01)
  *B29C 65/02* (2006.01)
  *B60K 15/03* (2006.01)

(52) U.S. Cl.
  CPC ............ *B29C 65/02* (2013.01); *B29C 66/712* (2013.01); *B60K 15/03177* (2013.01); *B60K 2015/03032* (2013.01); *B60K 2015/0346* (2013.01)

(58) Field of Classification Search
  CPC ..... B29C 70/026; B29C 70/78; B29C 70/086; B29C 65/1412; B29C 65/7802; B60K 15/03177; B60K 2015/03032; B60K 2015/0346; B32B 37/04; B29L 2031/7162
  See application file for complete search history.

(56) References Cited

FOREIGN PATENT DOCUMENTS

| DE | 102013004931 A1 | 9/2014 | |
|---|---|---|---|
| EP | 2607134 A1 | 6/2013 | |
| EP | 2664445 A1 | 11/2013 | |
| WO | WO-2008040766 A1 * | 4/2008 | ......... B29C 48/0022 |

OTHER PUBLICATIONS

Chinese Search Report for Chinese Patent Application No. 202010406161.6 dated Oct. 21, 2021.
European Search Report for European Patent Application No. 191746513.0, dated Dec. 20, 2019, 4 pages.
Chinese Search Report for Chinese Patent Application No. 202010406161.6 dated May 6, 2022.

* cited by examiner

METHOD OF MANUFACTURING A PLASTIC TANK WITH REINFORCEMENTS

CROSS-REFERENCE TO RELATED APPLICATIONS

The present application claims priority 35 U.S.C. § 119 to European Patent Publication No. EP 19174651.0 (filed on May 15, 2019), which is hereby incorporated by reference in its entirety.

TECHNICAL FIELD

Embodiments relate generally to a method for producing a plastic tank having reinforcements.

BACKGROUND

For some time in motor vehicle construction, tanks, especially plastic tanks, have been manufactured not only from metal but increasingly also from plastic. Plastic tanks of this kind are easy and inexpensive to produce, but the mechanical strength of plastic tanks is not sufficient for all uses.

Particularly when operating low-emission vehicles, such as partial zero emissions vehicles (PZEV), there is a need for operating strategies for tank systems which provide constant pressures up to 400 mbar and pressure peaks of minus 210 mbar and plus 560 mbar, which can lead to large deformations in certain zones of the tank system. Particularly in the case of tanks with shell material composed of plastics, concatenations of pressure and temperature peaks in certain operating states of the system can result in large relative movements of the tank shell due to elastic and plastic deformations, and these must be limited by structural measures.

In some cases, therefore, plastic tanks, especially pressurized tanks, must be constructed with reinforcing measures.

Known supporting concepts generally use points of support that are fixed with respect to the body in order to limit deformations of the tank blister. For tank systems that are under pressure, these measures are not sufficient, however, and additional measures must be used to reduce deformations. Often, the shell thickness of the tank blister is increased, or reinforcing welded-on internal components are used to limit deformation. Such measures entail significant sacrifices in terms of the tank volume and thus limit the functioning of the system.

SUMMARY

Embodiments relate to a method for producing a plastic tank having reinforcements which ensures efficient reinforcement of the tank and, at the same time, can be carried out in a simple and inexpensive manner.

In accordance with embodiments, a method for producing a plastic tank having reinforcements, may comprise the following steps: forming at least one part of the tank wall with a semi-finished panel made of plastic having at least one outer layer composed of a first thermoplastic; forming a reinforcement for the tank wall with at least one fibre-reinforced structural component comprising a matrix composed of a second thermoplastic that is weldable to the first thermoplastic; applying the fibre-reinforced structural component to a predefined region of the outer layer of the semi-finished panel; fusing the fibre-reinforced structural component with the outer layer of the semi-finished panel by applying heat (e.g., passing through a continuous furnace) to the semi-finished panel and the applied fibre-reinforced structural component; and forming the fused fibre-reinforced structural component with the outer layer of the semi-finished panel into a final shape of at least said part of the tank wall. Additionally, connecting the shaped fibre-reinforced structural component to at least one other part of the tank wall to form the complete tank wall of the plastic tank.

In accordance with embodiments, a plastic tank is manufactured at least in part from a semi-finished panel made of plastic, which is passed through a continuous furnace to heat it for a forming process. To reinforce, and thus, reduce deformations of the plastic tank produced, at least one, preferably a plurality of, fibre-reinforced structural components is applied to the semi-finished panel in a region which is to be reinforced before it passes through the continuous furnace. For this purpose, the area of the fibre-reinforced structural component is less than the area of the semi-finished panel, with the result that the fibre-reinforced structural component forms a "patch," also referred to as a "fibre mat." The fibre-reinforced structural component uses a matrix material which is weldable to the material that has the semi-finished panel at least on the side on which the fibre-reinforced structural component is applied. This allows a materially integral bond of the matrix of the fibre mat to the shell material. The first thermoplastic and the second thermoplastic may be chemically similar. The first thermoplastic is preferably the same material as the second thermoplastic. During the passage through the continuous furnace or tunnel furnace which is necessary in any case, the fibre-reinforced structural component is therefore fused or welded to the semi-finished panel. Through the targeted application of the fibre-reinforced structural component or components, good reinforcement of the plastic tank is achieved. The method exploits the heat of the continuous furnace and can be carried out at low cost.

In accordance with embodiments, during the forming process, either the complete tank or part of the tank, e.g., a half shell of the plastic tank, is formed, thus enabling the overall tank to be completed by connecting one or more further parts, e.g., a further half shell with reinforcements which has been produced in this way.

In accordance with embodiments, the first thermoplastic of the outer layer of the semi-finished panel and/or the second thermoplastic of the matrix of the fibre-reinforced structural component are/is preferably high-density polyethylene (HDPE) or polyamide (PA) or linear low density polyethylene (LLDPE).

In accordance with embodiments, a plurality of fibre-reinforced structural components is provided as a reinforcement for the tank wall of the plastic tank. The fibre-reinforced structural components may each comprise a matrix composed of the second thermoplastic. The fibre-reinforced structural components are applied to predefined regions of the outer layer of the semi-finished panel. The semi-finished panel, together with the applied fibre-reinforced structural components, pass through a continuous furnace to fuse the fibre-reinforced structural components with the outer layer of the semi-finished panel. Thereafter, the semi-finished panel, together with the fibre-reinforced structural components fused therewith, is formed into the final shape of at least said part of the tank wall.

In accordance with embodiments, both outer layers of the semi-finished panel may be composed of the first thermoplastic, and fibre-reinforced structural components are applied to predefined regions of both outer layers of the semi-finished panel, i.e., to both sides of the semi-finished panel. In that way, the fibre-reinforced structural components fuse to the respective outer layers of the semi-finished panel as the semi-finished panel with the applied fibre-reinforced structural components passes through the continuous furnace.

In accordance with embodiments, the semi-finished panel is placed on a conveyor belt to the continuous furnace and/or through the continuous furnace, and the application or fusing of the fibre-reinforced structural component to the semi-finished panel takes place on the conveyor belt.

As a particular preference, first of all, at least one fibre-reinforced structural component is laid on the conveyor belt, after which the semi-finished panel is laid on the at least one fibre-reinforced structural component, and then at least one further fibre-reinforced structural component is laid on the semi-finished panel. The assembly comprising the semi-finished panel and the fibre-reinforced structural components then passes through the continuous furnace and is formed. Forming is preferably accomplished by deep drawing.

In accordance with embodiments, before forming and after the passage through the continuous furnace, the predefined region(s) of the semi-finished panel to which fibre-reinforced structural components have been applied is/are explicitly heated once again, in particular via regulatable infrared heating elements, thus ensuring that good formability is achieved.

In accordance with embodiments, the laying of the fibre-reinforced structural component and/or the laying of the semi-finished panel on the conveyor belt are/is preferably performed via a positioning device, in particular, a manipulator or robot.

DRAWINGS

Embodiments will be illustrated by way of example in the drawings and explained in the description hereinbelow.

DESCRIPTION

Figure 1:
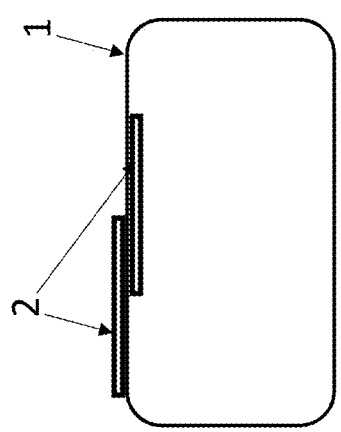
FIG. 1 illustrates a schematic of a plastic container having reinforcements, which is produced by a method in accordance with embodiments.

FIG. 1 illustrates a plastic container which has been produced by the method in accordance with embodiments.

The plastic container comprises a tank wall, which is formed from the semi-finished panel 1 or from a plurality of semi-finished panels 1 and comprises one or more fibre-reinforced structural components 2 as reinforcements. In the example in FIG. 1, a fibre-reinforced structural component 2 has been applied to the outside of the tank wall, and a further fibre-reinforced structural component 2 has been applied to the inside of the tank wall.

Figure 2:
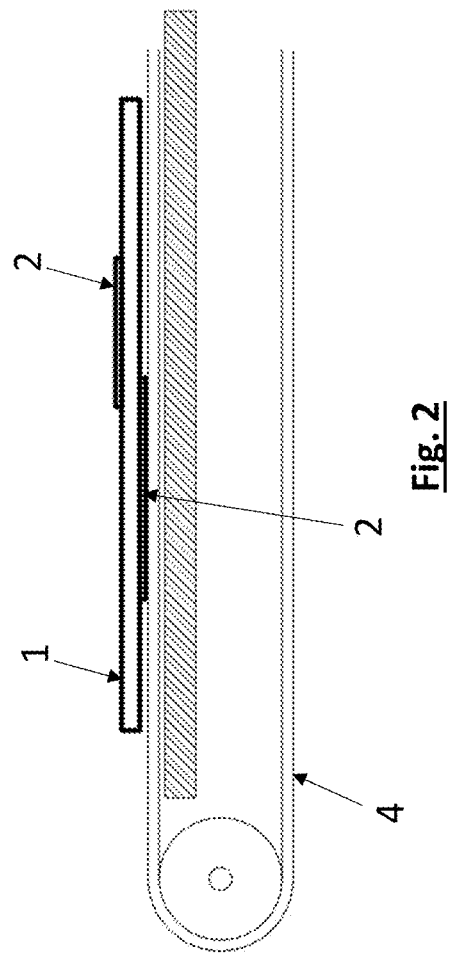
FIG. 2 illustrates a schematic of an intermediate state during the production of the plastic tank of FIG. 1 by the method in accordance with embodiments.

As illustrated in FIG. 2, the tank is preferably produced with the aid of a conveyor belt 4. First of all, at least one fibre-reinforced structural component 2 is laid on the conveyor belt 4, after which a semi-finished panel 1 is laid on the at least one fibre-reinforced structural component 2, and then at least one further fibre-reinforced structural component 2 is laid on the semi-finished panel 1.

Figure 3:
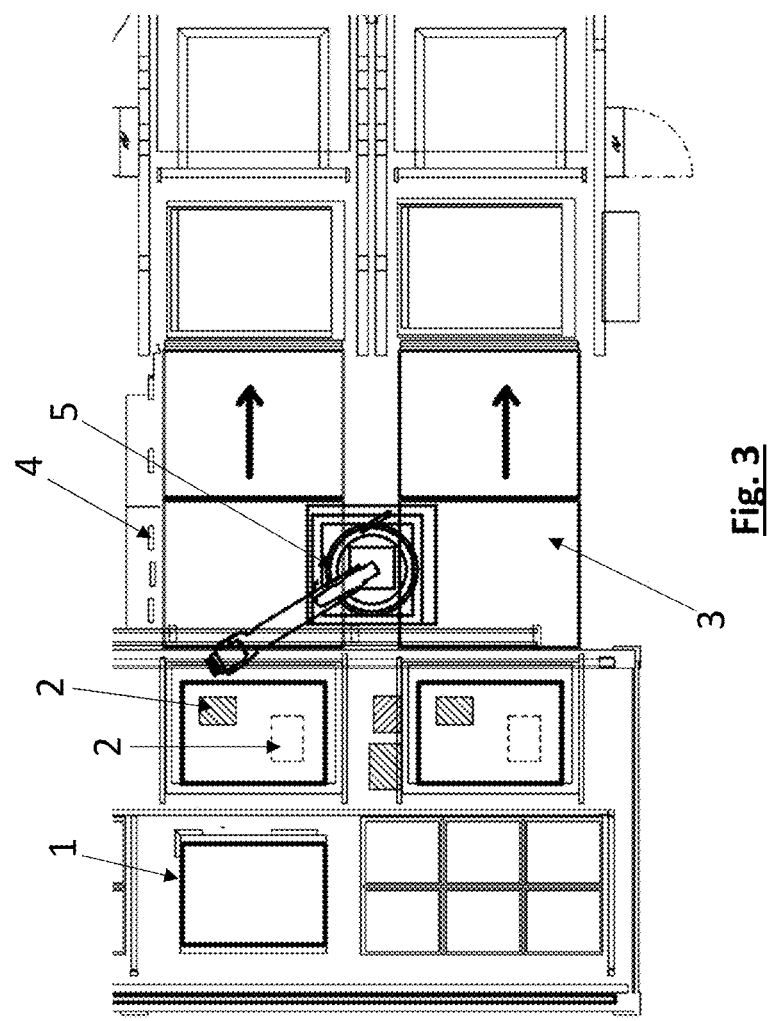
FIG. 3 illustrates a schematic of a device for producing the plastic tank of FIG. 1 by the method in accordance with embodiments.

As illustrated in FIG. 3, the laying of the fibre-reinforced structural component 2 and/or the laying of the semi-finished panel 1 on the conveyor belt 4 are/is performed via a positioning device 5.

In accordance with embodiments, a local deformation of a tank shell is thus reduced by applying fibre-reinforced structural components 2. The application of these patches can take place inside and outside the tank and thus on each of the two outer sides of the semi-finished panel 1 from which the tank is produced.

The method described herein is based on the positioning and fusing or welding of the matrix material, in particular HDPE, of the fibre patches or fibre-reinforced structural components 2 with the HDPE outer layer material of the tank shell. This is achieved during the passage through the tunnel furnace 3 for heating the semi-finished panel 1 before the deep drawing process.

In a production step or block, the fibre patch 2 for application to the tank inner wall is laid on the conveyor belt 3 by a suitable positioning device 5. After positioning has taken place, the semi-finished panel 1 is then laid on the fibre patch 2. In the third step, a further fibre patch 2, for the tank outer wall, is also laid on the semi-finished panel by the positioning device 5.

The assembly comprising the semi-finished panel 1 is then moved through the continuous furnace 3 via the conveyor belt 4, and the panel 1 is heated. During the heating process, the fibre patches 2 fuse to the semi-finished panel 1.

After the composite panel produced in this way has been picked up, the regions having the fibre patches 2 are explicitly heated again by regulatable infrared heating elements in order to ensure good formability. The deep drawing process then takes place.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1 semi-finished panel
2 fibre-reinforced structural component
3 continuous furnace
4 conveyor belt
5 positioning device

What is claimed is:

1. A method for producing a plastic tank having reinforcements, the method comprising:
   providing a semi-finished panel composed of plastic to form at least one part of the tank wall of the plastic tank, the semi-finished panel having at least one outer layer composed of a first thermoplastic;

providing at least one fibre-reinforced structural component, having an overall area that is less than an overall area of the semi-finished panel, as a reinforcement for the tank wall in a manner such that the fibre-reinforced structural component forms a patch, the fibre-reinforced structural component comprising a matrix composed of a second thermoplastic that is weldable to the first thermoplastic;

applying the at least one fibre-reinforced structural component to a predefined region of an outer layer of the semi-finished panel;

fusing the at least one fibre-reinforced structural component with the outer layer of the semi-finished panel during a heating of the semi-finished panel caused by passing the semi-finished panel with the applied fibre-reinforced structural component through a continuous furnace;

forming the heated semi-finished panel with the fibre-reinforced structural component fused therewith, into a final shape of at least one part of the tank wall; and connecting the at least one part of the tank wall to at least one other part of the tank wall to form a complete tank wall of the plastic tank.

2. The method of claim 1, wherein the first thermoplastic comprises one or more of high-density polyethylene (HDPE), polyamide (PA), and linear low density polyethylene (LLDPE).

3. The method of claim 2, wherein the second thermoplastic comprises one or more of high-density polyethylene (HDPE), polyamide (PA), and linear low density polyethylene (LLDPE).

4. The method of claim 1, wherein the second thermoplastic comprises one or more of high-density polyethylene (HDPE), polyamide (PA), and linear low density polyethylene (LLDPE).

5. The method of claim 1, wherein forming the reinforcement comprises, in sequence:
   laying the at least one fibre-reinforced structural component on a conveyor belt,
   laying the semi-finished panel on the at least one fibre-reinforced structural component, and
   laying at least one additional fibre-reinforced structural component on the semi-finished panel.

6. The method of claim 5, wherein each laying is performed via a positioning device.

7. The method of claim 5, wherein fusing the fibre-reinforced structural component comprises moving the semi-finished panel along the conveyor belt through a continuous furnace.

8. The method of claim 7, wherein the fusing of the fibre-reinforced structural component to the semi-finished panel occurs on the conveyor belt.

9. The method of claim 1, wherein forming the fused is conducted by deep drawing.

10. The method of claim 1, further comprising, before the forming and after the fusing, heating the predefined region of the semi-finished panel.

11. A method for producing a plastic tank, the method comprising:
   laying a first fibre-reinforced structural component on a conveyor belt as a first fibre-reinforced patch for an inner wall of the plastic tank;
   laying the semi-finished panel on the first fibre-reinforced structural component;
   laying a second fibre-reinforced structural component on the semi-finished panel as a second fibre-reinforced patch for an outer wall of the plastic tank;
   fusing the first fibre-reinforced patch and the second fibre-reinforced patch with the semi-finished panel during a heating of the semi-finished panel caused by moving the semi-finished panel with the applied first fibre-reinforced patch and the applied second fibre-reinforced patch through a continuous furnace;
   forming, after fusing the first fibre-reinforced patch and the second fibre-reinforced patch with the outer layer of the semi-finished panel, the semi-finished panel into a final shape of at least one part of the tank wall; and
   connecting the at least one part of the tank wall to at least one other part of the tank wall to form a complete tank wall of the plastic tank.

12. The method of claim 11, wherein:
   the first thermoplastic comprises one or more of high-density polyethylene (HDPE), polyamide (PA), and linear low density polyethylene (LLDPE); and/or
   the second thermoplastic comprises one or more of high-density polyethylene (HDPE), polyamide (PA), and linear low density polyethylene (LLDPE).

13. The method of claim 11, wherein forming the reinforcements comprises, in sequence:
   laying the fibre-reinforced structural components on a conveyor belt,
   laying the semi-finished panel on the fibre-reinforced structural components, and
   laying at least one additional ones of the fibre-reinforced structural components on the semi-finished panel.

14. The method of claim 13, wherein each laying is performed via a positioning device.

15. The method of claim 11, wherein forming the fused fibre-reinforcement structural components and semi-finished panel is conducted by deep drawing.

16. The method of claim 11, further comprising, before the forming and after the fusing, heating the predefined regions of the semi-finished panel.

17. A method for producing a plastic tank, the method comprising:
   applying, as reinforcements for a tank wall of the plastic tank, a first fibre-reinforced patch and a second fibre-reinforced patch to predefined regions of an outer layer of a semi-finished panel which is composed of plastic and forms at least one part of a tank wall of the plastic tank, wherein the outer layer is composed of a first thermoplastic and the first fibre-reinforced patch is arranged inside the tank wall and the second fibre-reinforced patch is arranged outside the tank wall;
   causing a fusing of the first fibre-reinforced patch and the second fibre-reinforced patch with the outer layer of the semi-finished panel by heating the semi-finished panel when moving the semi-finished panel with the applied one or more fibre-reinforced patches through a continuous furnace;
   forming, by deep drawing after fusing the first fibre-reinforced patch and the second fibre-reinforced patch with the outer layer of the semi-finished panel, the semi-finished panel into a final shape of at least one part of the tank wall; and
   connecting the at least one part of the tank wall to at least one other part of the tank wall to form a complete tank wall of the plastic tank.

* * * * *